(12) United States Patent
Huang et al.

(10) Patent No.: US 7,447,511 B2
(45) Date of Patent: Nov. 4, 2008

(54) METHOD AND DEVICE FOR EQUALIZING MODE SELECTION

(75) Inventors: Ke-Chiang Huang, Hsinchu (TW); Kuo-Feng Hsu, Jhudong Township, Hsinchu County (TW); Jiunn-Yih Lee, Hsinchu (TW); Hsian-Feng Liu, Fongshan (TW)

(73) Assignee: Mstar Semiconductor, Inc., Hsinchu County (TW)

( * ) Notice: Subject to any disclaimer, the term of this patent is extended or adjusted under 35 U.S.C. 154(b) by 631 days.

(21) Appl. No.: 11/140,894

(22) Filed: Jun. 1, 2005

(65) Prior Publication Data

US 2005/0270076 A1    Dec. 8, 2005

(51) Int. Cl.
*H04B 7/00* (2006.01)
(52) U.S. Cl. .................. 455/501; 327/18; 327/119; 375/232; 375/327
(58) Field of Classification Search .................. 455/501
See application file for complete search history.

(56) References Cited

U.S. PATENT DOCUMENTS

| | | | | |
|---|---|---|---|---|
| 4,815,103 A | * | 3/1989 | Cupo et al. .................. | 375/234 |
| 4,873,700 A | * | 10/1989 | Wong .......................... | 375/317 |
| 5,036,525 A | * | 7/1991 | Wong .......................... | 375/232 |
| 5,432,794 A | * | 7/1995 | Yaguchi ...................... | 714/708 |
| 5,535,337 A | * | 7/1996 | Hogan et al. ................ | 709/248 |
| 5,581,585 A | * | 12/1996 | Takatori et al. ............. | 375/376 |
| 5,666,548 A | * | 9/1997 | Grimm et al. ................ | 712/1 |
| 5,680,151 A | * | 10/1997 | Grimm et al. ................ | 345/419 |
| 5,777,499 A | * | 7/1998 | Takaishi ...................... | 327/159 |
| 5,805,001 A | * | 9/1998 | Sheahan et al. ............. | 327/142 |

(Continued)

OTHER PUBLICATIONS

Alrtutz, et al., "A Single Chip Video Front End Decoder", IEEE 1993, pp. 489-495.*

*Primary Examiner*—Matthew D. Anderson
*Assistant Examiner*—Hai V Nguyen
(74) *Attorney, Agent, or Firm*—WPAT., P.C.; Justin King

(57) ABSTRACT

A method and a device for equalizing mode selection are disclosed. The method comprises steps of: providing first sampling pulses in response to an equalized signal; providing second sampling pulses lagging behind the first sampling pulses for a pre-determined phase shift for sampling the equalized signal; establishing a first observing window and a second observing window according to the first sampling pulses and the second sampling pulses, so as to determine whether each of a plurality of equalizing modes is good or bad; and selecting one equalizing mode among the plurality of equalizing modes. The device comprises: a programmable equalizer, having a plurality of equalizing modes, receiving an original signal so as to output an equalized signal; a phase-locked loop, receiving a reference clock signal and a first control signal so as to output first sampling pulses and second sampling pulses; a data slicing device, coupled to the phase-locked loop and the programmable equalizer and receiving the first sampling pulses, the second sampling pulses and the equalized signal so as to output a first slicing signal and a second slicing signal; and a signal processing device, coupled to the data slicing device and receiving the first slicing signal and the second slicing signal so as to output the first control signal and a second control signal; wherein the signal processing device programs the programmable equalizer by using the second control signal so as to select an equalizing mode from the plurality of equalizing modes for the programmable equalizer.

16 Claims, 6 Drawing Sheets

U.S. PATENT DOCUMENTS

| | | | |
|---|---|---|---|
| 5,844,507 A * | 12/1998 | Zook | 341/50 |
| 5,900,746 A * | 5/1999 | Sheahan | 326/73 |
| 5,917,794 A * | 6/1999 | Honma | 369/59.15 |
| 5,970,092 A * | 10/1999 | Currivan | 375/232 |
| 5,987,320 A * | 11/1999 | Bobick | 455/423 |
| 6,046,874 A * | 4/2000 | Takahashi | 360/65 |
| 6,078,454 A * | 6/2000 | Takahashi et al. | 360/66 |
| 6,097,767 A * | 8/2000 | Lo et al. | 375/327 |
| 6,097,769 A * | 8/2000 | Sayiner et al. | 375/341 |
| 6,188,721 B1 * | 2/2001 | Shirani et al. | 375/232 |
| 6,215,818 B1 * | 4/2001 | Velez et al. | 375/233 |
| 6,735,264 B2 * | 5/2004 | Miller | 375/340 |
| 6,803,966 B2 * | 10/2004 | Hong | 348/500 |
| 6,898,415 B2 * | 5/2005 | Berliner et al. | 455/63.1 |
| 7,154,946 B1 * | 12/2006 | Katic et al. | 375/233 |
| 7,176,721 B2 * | 2/2007 | Ho et al. | 326/82 |
| 7,206,337 B2 * | 4/2007 | Tonietto et al. | 375/220 |
| 7,248,607 B2 * | 7/2007 | Kawamae et al. | 370/529 |
| 7,317,738 B2 * | 1/2008 | Kawamae et al. | 370/535 |
| 2005/0002474 A1 * | 1/2005 | Limberg | 375/321 |
| 2007/0121463 A1 * | 5/2007 | Minemura | 369/59.21 |

* cited by examiner

METHOD AND DEVICE FOR EQUALIZING MODE SELECTION

BACKGROUND OF THE INVENTION

1. Field of the Invention

The present invention generally relates to a method and a device for equalizing mode selection and, more particularly, to a method and a device for equalizing mode selection using two sets of sampling pulses.

2. Description of the Prior Art

Generally, parasitic impedance leading to transmission loss occurs during long distance transmission, especially in high-frequency applications. In order to compensate the loss of the signal during transmission, there is often provided an equalizer at the receiving end so as to reestablish the transmitted signal and enhance the transmission reliability.

An eye diagram associated with a digital signal output from an equalizer is often used to determine whether the equalizer is good or bad. Generally, a distorted digital output from the equalizer has non-vertical edges to the time axis and has transitions shifting from the ideal timing points. By overlaying the ideal timing points, these non-vertical edges form intervals, which are often referred to as "eyes".

Please refer to FIG. 1, which is a diagram showing comparison between a good equalizer and a bad equalizer in response to ideal sampling pulses. The ideal sampling pulses are located right in the middle of the eyes, and bigger eyes indicate a better equalizer while smaller eyes indicate a worse equalizer.

Unfortunately, the sampling pulses are usually not located right in the middle of the eyes, which leads to mistakes in determining whether an equalizer is good or bad.

SUMMARY OF THE INVENTION

It is a primary object of the present invention to provide a method and a device for equalizing mode selection so as to select an equalizing mode in which output distortion of an equalizer is minimal, thus obtaining a good equalizer.

In order to achieve the foregoing object, the present invention provides a method for equalizing mode selection, comprising steps of: providing first sampling pulses for sampling an equalized signal; providing second sampling pulses lagging behind the first sampling pulses for a pre-determined phase shift for sampling the equalized signal; establishing a first observing window and a second observing window according to the first sampling pulses and the second sampling pulses for observing the equalized signal, so as to determine whether each of a plurality of equalizing modes is good or bad; and selecting one equalizing mode from the plurality of equalizing modes. Preferably, the first sampling pulses and the second sampling pulses have the same cycle and the second sampling pulses lag behind the first sampling pulses for a half-cycle phase shift.

It is preferable that whether each of the plurality of equalizing modes to be good or bad is determined according to a ratio representing transitions between two adjacent eyes in the first observing window in an eye diagram. Moreover, the ratio is minimal when the equalizing mode is the best. The method can further comprise steps of: determining the ratio; repeatedly determining the ratio by simultaneously advancing the first sampling pulses and the second sampling pulses; and determining whether each of the plurality of equalizing modes is good or bad according to the ratio. Moreover, the equalizing mode is the best equalizing mode in which the ratio representing transitions between two adjacent eyes in the first observing window is minimal.

The present invention further provides a device capable of selecting a good equalizing mode, comprising: a programmable equalizer, having a plurality of equalizing modes, receiving an original signal so as to output an equalized signal; a phase-locked loop, receiving a reference clock signal and a first control signal so as to output first sampling pulses and second sampling pulses; a data slicing device, coupled to the phase-locked loop and the programmable equalizer and receiving the first sampling pulses, the second sampling pulses and the equalized signal so as to output a first slicing signal and a second slicing signal; and a signal processing device, coupled to the data slicing device and receiving the first slicing signal and the second slicing signal so as to output the first control signal and a second control signal; wherein the signal processing device programs the programmable equalizer by using the second control signal so as to select an equalizing mode from the plurality of equalizing modes for the programmable equalizer. Preferably, the signal processing device comprises: a transition statistics measurement device, receiving the first slicing signal and the second slicing signal so as to output a measured signal; and a controller, receiving the measured signal so as to output the first control signal and the second control signal. The data slicing device comprises: a first data slicing device, receiving the equalized signal and the first sampling pulses so as to output the first slicing signal; a second data slicing device, receiving the equalized signal and the second sampling pulses so as to output the second slicing signal.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

A method and a device for equalizing mode selection can be exemplified by the preferred embodiments as described hereinafter.

Figure 1:
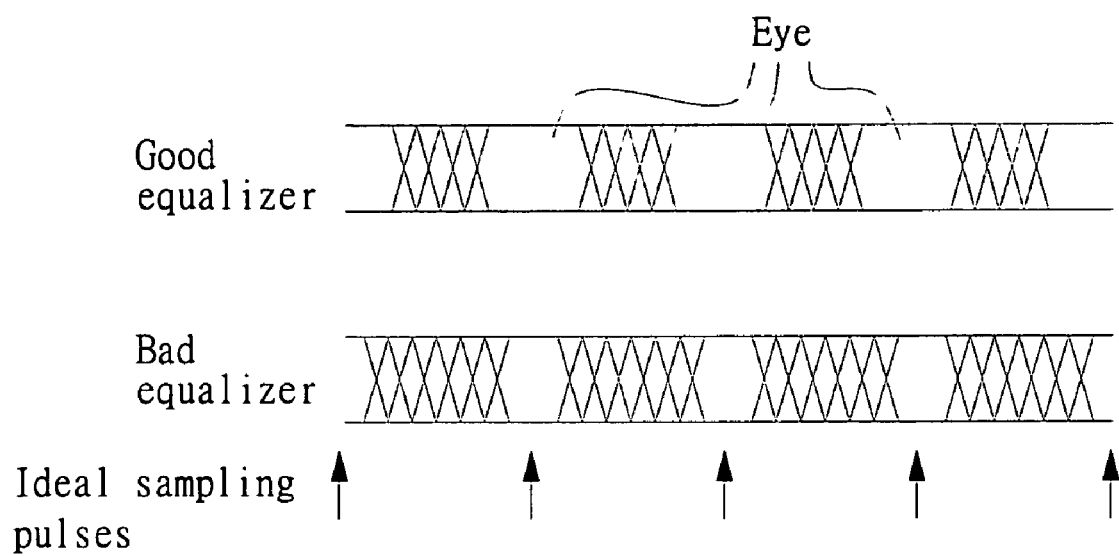
FIG. 1 is a diagram showing comparison between a good equalizer and a bad equalizer in response to ideal sampling pulses.
Figure 2:
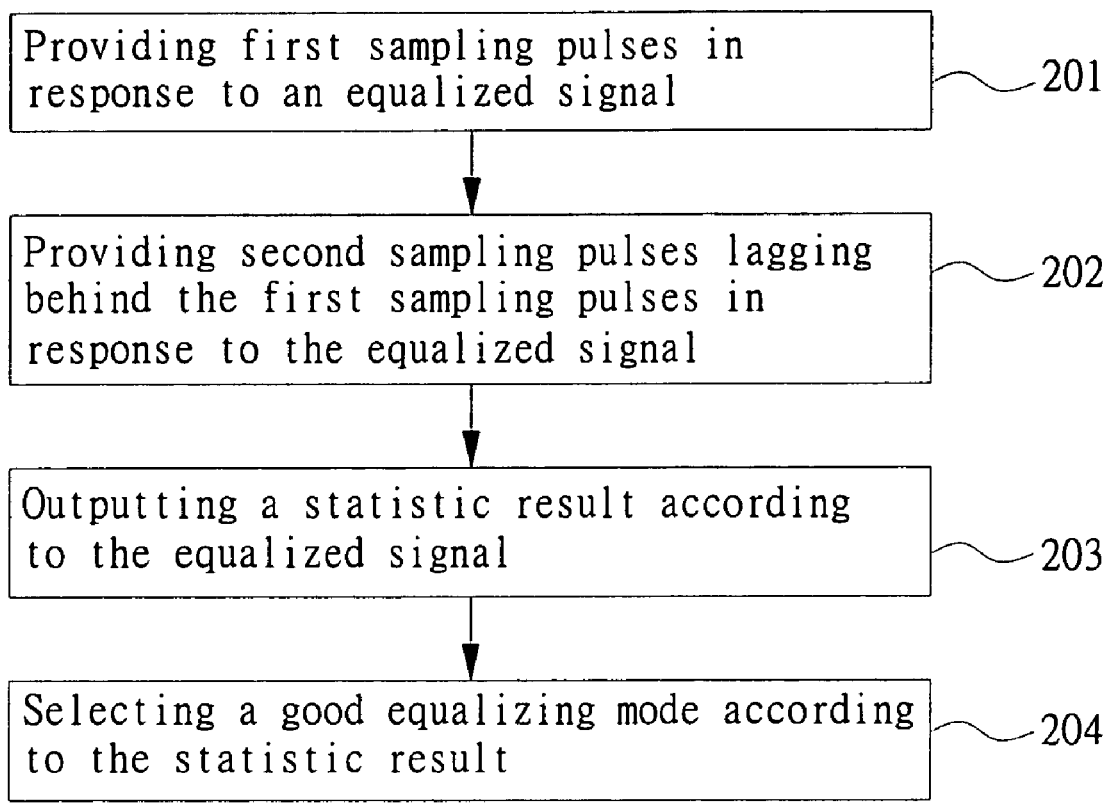
FIG. 2 is a flow chart showing a method for equalizing mode selection in accordance with the preferred embodiment of the present invention.

Please refer to FIG. 2, which is a flow chart showing a method for equalizing mode selection in accordance with the preferred embodiment of the present invention. In order to obtain a best equalizing mode, the method for equalizing mode selection begins with Step 201, in which first sampling pulses (I sampling pulses) are provided for sampling an equalized signal. In Step 202, second sampling pulses (Q sampling pulses) are provided lagging behind the first sampling pulses for a pre-determined phase shift for sampling the equalized signal.

Figure 3:
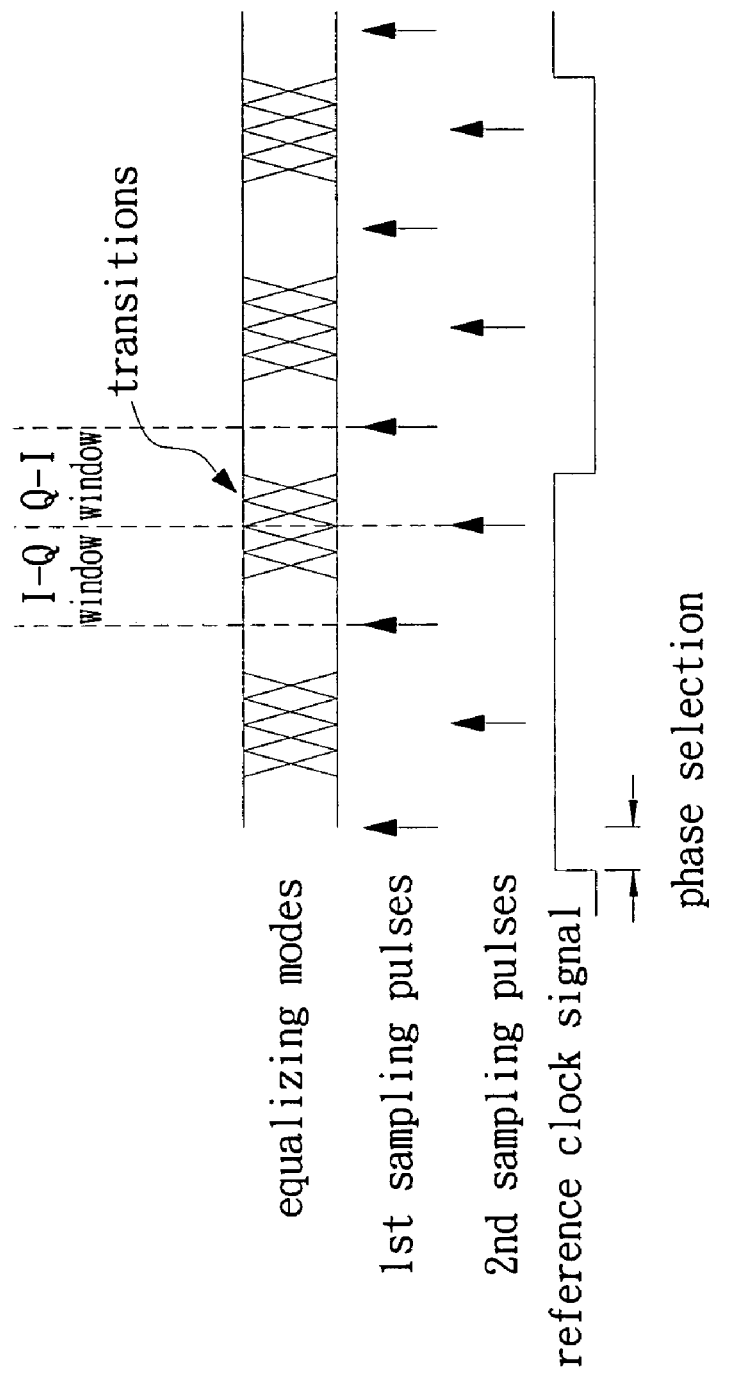
FIG. 3 is a diagram showing equalizing modes in response to two sets of sampling pulses in accordance with the preferred embodiment of the present invention.

Please also refer to FIG. 3, which is a diagram showing equalized signal with reference to two sets of sampling pulses in accordance with the preferred embodiment of the present invention. A reference clock signal is used to determine the phase shift between the first sampling pulses and the rising edge of the reference clock signal, i.e., the width of phase selection. The phase shift between the first sampling pulses and the second sampling pulses is later determined. In this preferred embodiment, the first sampling pulses and the second sampling pulses have the same cycle and the second sampling pulses lag behind the first sampling pulses for a half-cycle phase shift. For example, in FIG. 3, the period of time between two adjacent eyes in an eye diagram is a cycle, resulting in a cycle of the first sampling pulses being T, a cycle of the second sampling pulses being T and a cycle of the reference clock signal being 4T. Alternatively, the cycle of the reference clock signal can be 1T, 2T, 4T, 8T . . . etc. . . . It should be noted that in the preferred embodiment, a first sampling pulse (I) takes place after a pre-determined phase delay when a rising edge of the reference clock signal occurs, and a second sampling pulse (Q) takes place a half-cycle (T/2) phase shift after the first sampling pulse. Therefore, the pre-determined phase delay decides the time when the first sampling pulse (I) and the second sampling pulse (Q) take place.

As the first sampling pulses and the second sampling pulses are provided, a first observing window (I–Q window) and a second observing window (Q–I window) are established. As in Step 203, whether each of a plurality of equalizing modes is good or bad is determined according to a ratio representing transitions between two adjacent eyes in the first observing window in an eye diagram. Preferably, the ratio representing transitions between two adjacent eyes is known by statistically accumulating the transitions between two adjacent eyes. An equalizing mode is good when the eye in the eye diagram is large, while an equalizing mode is bad when the eye in the eye diagram is small. In other words, the equalizing mode selection of the present invention determines whether a selected equalizing mode is good or bad according to the ratio representing transitions between two adjacent eyes. Accordingly, the ratio representing transitions between two adjacent eyes is minimal when the equalizing mode is good.

Therefore, in Step 204, a better equalizing mode is selected according to the statistic result so as to equalize an original signal incoming to the receiving end of an equalizer.

Figure 4A:
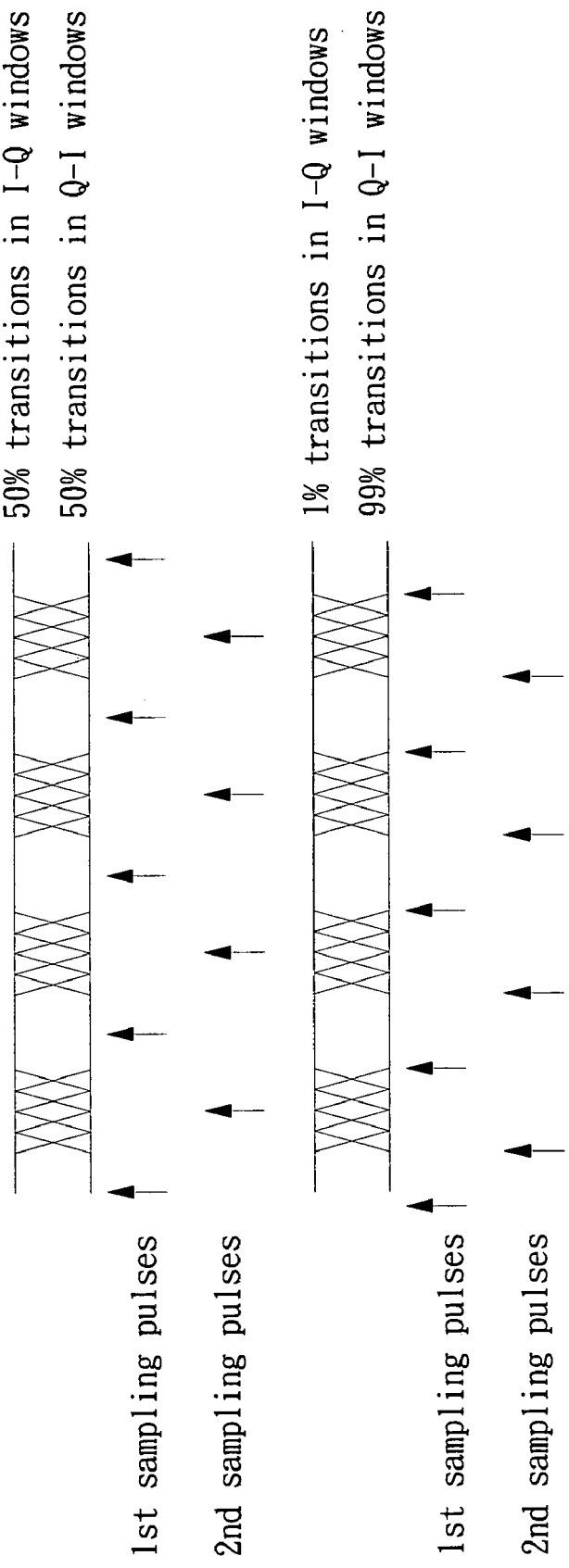
FIGS. 4A and 4B are diagrams showing a good equalizer and a bad equalizer, respectively, in accordance with the preferred embodiment of the present invention.
Figure 4B:
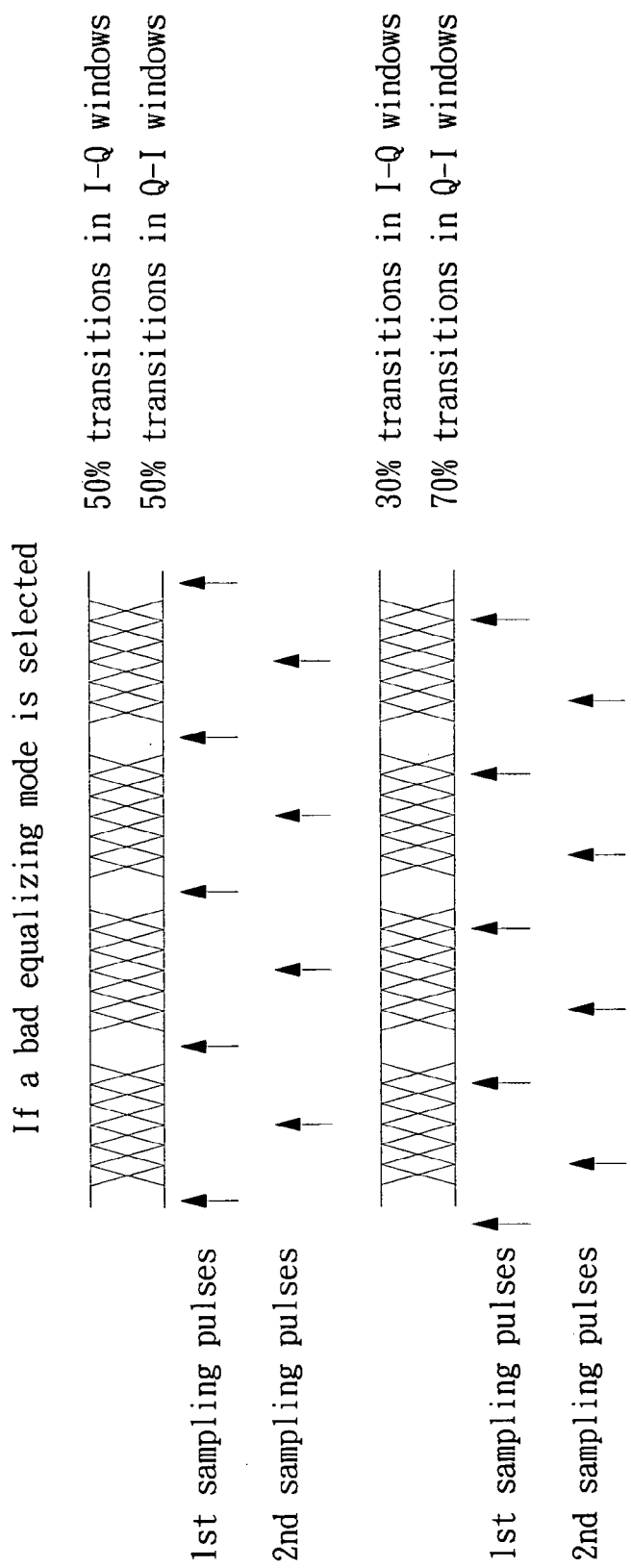

It should be noted that, in FIGS. 4A and 4B, it occurs the ratio is 50% which represents 50% transitions fall in both of I–Q window and Q–I window. Therefore, Step 203 comprises steps of: determining the ratio; repeating determining the ratio by simultaneously advancing the first sampling pulses and the second sampling pulses if the ratio is 50% transitions both in I–Q window and Q–I window; and determining whether each of the plurality of equalizing modes in response to the equalized signal is good or bad according to the ratio.

As seen in FIG. 4A, the ratio is even 1% transitions in I–Q window when a good equalizing mode is selected. However, the ratio appears 30% transitions in I–Q window when a bad equalizing mode is selected. Therefore, the selected equalizing mode is a best equalizing mode in which the ratio representing transitions between two adjacent eyes in the I–Q window is minimal.

The method of the present invention is advantageous in that the sampling pulses need not to be located right in the middle of the eyes so as to determine whether a selected equalizing mode is good or bad.

Figure 5:
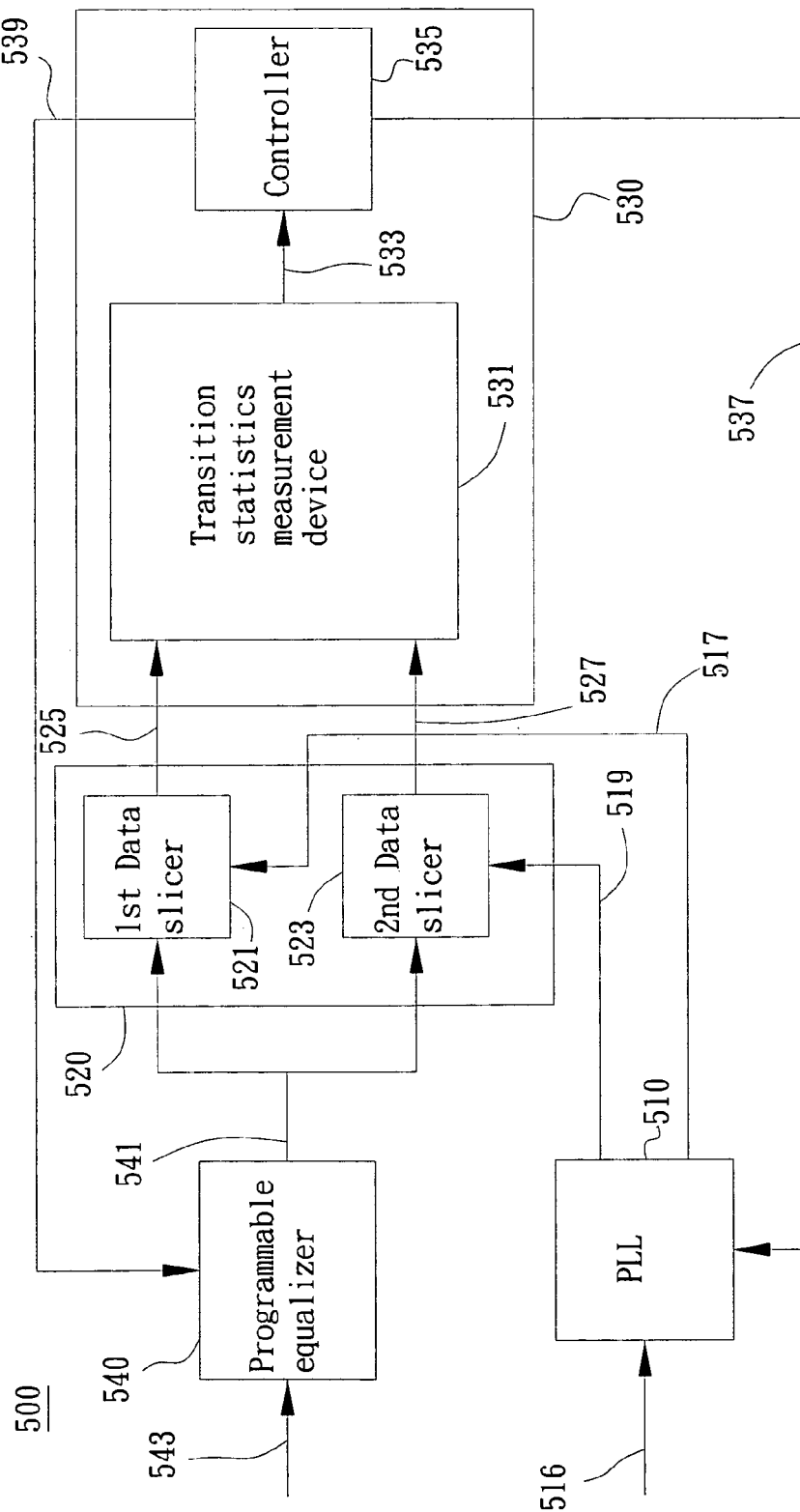
FIG. 5 is a block diagram showing a device for equalizing mode selection in accordance with the preferred embodiment of the present invention.

Please further refer to FIG. 5, which is a block diagram showing a device capable of selecting an equalizing mode in accordance with the preferred embodiment of the present invention. The device 500 capable of selecting the equalizing mode preferably comprises: a programmable equalizer 540, having a plurality of equalizing modes, receiving an original signal 543 so as to output an equalized signal 541; a phase-locked loop 510, receiving a reference clock signal 516 and a first control signal 537 so as to generate first sampling pulses 517 and second sampling pulses 519; a data slicing device 520, coupled to the phase-locked loop 510 and the programmable equalizer 540, for receiving the first sampling pulses 517, the second sampling pulses 519 and the equalized signal 541 so as to output a first slicing signal 525 and a second slicing signal 527; and a signal processing device 530, coupled to the data slicing device 520 and receiving the first slicing signal 525 and the second slicing signal 527 so as to output the first control signal 537 and a second control signal 539. More particularly, the signal processing device 530 programs the programmable equalizer 540 via the second control signal 539 so as to select an equalizing mode from the plurality of equalizing modes for the programmable equalizer 540.

The data slicing device 520 comprises: a first data slicing device 521, for receiving the equalized signal 541 and the first sampling pulses 517, so as to output the first slicing signal 525; and a second data slicing device 523, for receiving the equalized signal 541 and the second sampling pulses 519, so as to output the second slicing signal 527. The first slicing signal 525 and the second slicing signal 527 represent the sampled equalized signal by the first sampling pulses 517 and the second sampling pulses 519, respectively, as seen in FIG. 3.

The first slicing signal 525 and the second slicing signal 527 are measured by a transition statistics measurement device 531 of the signal processing device 530. The transition statistics measurement device 531 receives the first slicing signal 525 and the second slicing signal 527 so as to output a measured signal 533, in which the ratio represents transitions between two adjacent eyes in I–Q/Q–I observing window in the eye diagram. A controller 535 receives the measured signal 533 and determines whether the selected equalizing mode is good or bad so as to output the first control signal 537 and the second control signal 539.

The signal processing device 530 controls the phase-locked loop 510 via the first control signal 537 so as to control a phase shift between the first control signal 517 and the second control signal 519. The programmable equalizer 540 is capable of selecting a better equalizing mode for the original signal 543 via the second control signal 539 in order to generate a good equalized signal. For example, when the present invention is applied in a digital video interface (DVI) receiver, the programmable equalizer 540 can be designed for multiple lengths of 1 m (meter), 2 m . . . 8 m, i.e., eight available equalizing modes.

Preferably, the designer measures the transmission characteristics for the transmission cable with reference to different lengths and then designs multiple sub-equalizers with proper frequency responses corresponding to the previous measured characteristics into the programmable equalizer 540 in design phase. In this embodiment, three bits are required to program the programmable equalizer 540 in response to eight different lengths so as to obtain the best equalizing mode. When the DVI receiver detects an incoming signal from a transmission cable, each of the eight equalizing modes is applied onto the original signal 543. The measured results transmitted through the measured signal 533 for eight equalizing modes are then stored in the controller 535. According to the above disclosure, the controller 535 is capable of selecting the best equalizing mode from the eight equalizing modes according to the measured results and properly asserts the aforementioned three bits through the second control signal 539, such that the programmable equalizer 540 operates in a good equalizing mode. Alternatively, the controller 535 may directly select a proper equalizing mode without examining each of the eight modes by comparing the statistic result with a threshold. On the other hand, through the control signal 537 the controller 535 controls the phase-locked loop 510 so as to generate the first sampling pulses 517 and the second sampling pulses 519 that have different phase differences with reference to the reference clock signal 516.

It should be noted that various modifications of the preferred embodiment can be made by persons of ordinary skills in the art, and thus the preferred embodiment of the present invention is only exemplary and should not limit the scope of the present invention.

According to the above disclosure, the present invention discloses a method and a device for equalizing mode selection preferably utilizing two sets of sampling pulses so as to select an equalizing mode in which output distortion of an equalizer is minimized.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A device capable of selecting one equalizing mode from a plurality of equalizing modes, comprising:
    a programmable equalizer, having said equalizing modes, for receiving an original signal to output an equalized signal;
    a phase-locked loop, receiving a reference clock signal and a first control signal so as to output first sampling pulses and second sampling pulses;
    a data slicing device, coupled to said phase-locked loop and said programmable equalizer, for receiving said first sampling pulses, said second sampling pulses and said equalized signal to output a first slicing signal and a second slicing signal; and
    a signal processing device, coupled to said data slicing device, for receiving said first slicing signal and said second slicing signal to output said first control signal and a second control signal;
    wherein said signal processing device programs said programmable equalizer according to said second control signal so as to select said equalizing mode from said plurality of equalizing modes for said programmable equalizer.

2. The device capable of selecting one equalizing mode as recited in claim 1, wherein said signal processing device comprises:
    a transition statistics measurement device, receiving said first slicing signal and said second slicing signal so as to output a measured signal; and
    a controller, receiving said measured signal so as to output said first control signal and second control signal.

3. The device capable of selecting a good equalizing mode as recited in claim 2, wherein a cycle ratio of said reference clock signal, said first control signal and said second control signal is 4:1:1.

4. The device capable of selecting one equalizing mode as recited in claim 3, wherein said first sampling pulses and said second sampling pulses have the same sampling cycle while said second sampling pulses lag behind said first sampling pulses for a half-cycle phase shift.

5. The device capable of selecting one equalizing mode as recited in claim 2, wherein said transition statistics measurement device measures the number of transitions of said equalized signal according to said first slicing signal and said second slicing signal within a pre-determined period of time.

6. The device capable of selecting one equalizing mode as recited in claim 1, wherein said data slicing device comprises:
    a first data slicing device, receiving said equalized signal and said first sampling pulses so as to output said first slicing signal; and
    a second data slicing device, receiving said equalized signal and said second sampling pulses so as to output said second slicing signal.

7. The device capable of selecting one equalizing mode as recited in claim 1, wherein said signal processing device controls said phase-locked loop by using said first control signal so as to control a phase shift between said reference clock signal, said first control signal and said second control signal.

8. A method for equalizing mode selection, comprising steps of:
    providing first sampling pulses for sampling an equalized signal;
    providing second sampling pulses lagging behind said first sampling pulses for a pre-determined phase shift for sampling said equalized signal;
    establishing a first observing window and a second observing window for said equalized signal according to said first sampling pulses and said second sampling pulses, so as to determine whether each of a plurality of equalizing modes is good; and
    selecting one equalizing mode from said plurality of equalizing modes.

9. The method for equalizing mode selection as recited in claim 8, wherein said selected equalizing mode is a best equalizing mode.

10. The method for equalizing mode selection as recited in claim 8, wherein said first sampling pulses and said second sampling pulses are provided according to a reference signal.

11. The method for equalizing mode selection as recited in claim 8, wherein said first sampling pulses and said second sampling pulses have the same cycle.

12. The method for equalizing mode selection as recited in claim 11, wherein said second sampling pulses lag behind said first sampling pulses for a half-cycle phase shift.

13. The method for equalizing mode selection as recited in claim 12, wherein said establishing step determines whether each of said plurality of equalizing modes is good according to a ratio representing transitions between two adjacent eyes in said first observing window in an eye diagram.

14. The method for equalizing mode selection as recited in claim 13, wherein said ratio is minimal when said equalizing mode is good.

15. The method for equalizing mode selection as recited in claim 14, further comprising steps of:
- determining said ratio;
- repeating determining said ratio by simultaneously advancing said first sampling pulses and said second sampling pulses; and
- determining whether each of said plurality of equalizing modes is good according to said ratio.

16. The method for equalizing mode selection as recited in claim 15, wherein said selected equalizing mode is a best equalizing mode while said ratio representing transitions between two adjacent eyes in said first observing window is minimal.

* * * * *